US012134931B2

(12) United States Patent
Briese

(10) Patent No.: US 12,134,931 B2
(45) Date of Patent: Nov. 5, 2024

(54) SPACER FRAME WITH RISING LOCKING MEMBER

(71) Applicant: GED INTEGRATED SOLUTIONS, INC., Glenwillow, OH (US)

(72) Inventor: William A. Briese, Hinckley, OH (US)

(73) Assignee: GED Integrated Solutions, Inc., Glenwillow, OH (US)

(*) Notice: Subject to any disclaimer, the term of this patent is extended or adjusted under 35 U.S.C. 154(b) by 500 days.

(21) Appl. No.: 17/405,401

(22) Filed: Aug. 18, 2021

(65) Prior Publication Data

US 2022/0056754 A1 Feb. 24, 2022

Related U.S. Application Data

(60) Provisional application No. 63/066,934, filed on Aug. 18, 2020.

(51) Int. Cl.
*E06B 3/663* (2006.01)
*E06B 3/667* (2006.01)
*E06B 3/673* (2006.01)

(52) U.S. Cl.
CPC .......... *E06B 3/66309* (2013.01); *E06B 3/667* (2013.01); *E06B 3/67313* (2013.01)

(58) Field of Classification Search
CPC .. E06B 3/66309; E06B 3/667; E06B 3/67313; E06B 2003/66395
See application file for complete search history.

(56) References Cited

U.S. PATENT DOCUMENTS 5,361,476 A 11/1994 Leopold
5,678,377 A * 10/1997 Leopold .................. E06B 3/667 52/712
7,448,246 B2 11/2008 Briese et al.
7,610,681 B2 11/2009 Calcei et al.
7,866,033 B2 * 1/2011 James ................. E06B 3/67308 29/710

(Continued)

FOREIGN PATENT DOCUMENTS

DE 20200349 U1 5/2003
DE 102005007230 A1 * 9/2006 ............. E06B 3/667
WO WO 2018/064522 A1 4/2018

OTHER PUBLICATIONS

International Search Report and Written Opinion In corresponding application PCT/US2021/46481, filled Aug. 18, 2021. (8 pages).

(Continued)

*Primary Examiner* — Christine T Cajilig
(74) *Attorney, Agent, or Firm* — Watts Law LLC; Samantha R. Smart, Esq.

(57) ABSTRACT

A spacer frame assembly and method of manufacturing that includes a substantially linear channel comprising two lateral walls connected by a base wall, the channel having first and second ends that when assembled, includes at least three sides and corresponding corners between each of the sides; the linear channel further includes a nose portion of the first end and a receiving portion of the second end having a channel for receiving the nose portion; and the nose portion comprising a first undulation in the first end and the receiving portion comprising a second undulation in the second end. The first and second undulations nest when the ends are in an assembled position.

20 Claims, 16 Drawing Sheets

(56) References Cited

U.S. PATENT DOCUMENTS

| | | | | |
|---|---|---|---|---|
| 8,720,026 | B2 | 5/2014 | McGlinchy | |
| 8,904,611 | B2 | 12/2014 | Calcei et al. | |
| 9,416,583 | B2 | 8/2016 | Briese et al. | |
| 9,428,953 | B2 * | 8/2016 | Briese | E04B 5/10 |
| 10,267,083 | B2 * | 4/2019 | Briese | E06B 3/67313 |
| 11,008,801 | B2 | 5/2021 | Briese et al. | |
| 2003/0033761 | A1 | 2/2003 | Boone et al. | |
| 2013/0212957 | A1 | 8/2013 | Cempulik et al. | |
| 2015/0361713 | A1 * | 12/2015 | Briese | E06B 3/67313 29/527.1 |
| 2016/0222717 | A1 * | 8/2016 | Bienick | E06B 3/66309 |
| 2016/0258205 | A1 * | 9/2016 | Oquendo | E06B 3/66304 |
| 2018/0094476 | A1 * | 4/2018 | Briese | B21D 53/74 |

OTHER PUBLICATIONS

Extended European Search Report and Written Opinion dated Sep. 3, 2024, in corresponding European patent application No. 201859046.1. (7 pages).

* cited by examiner

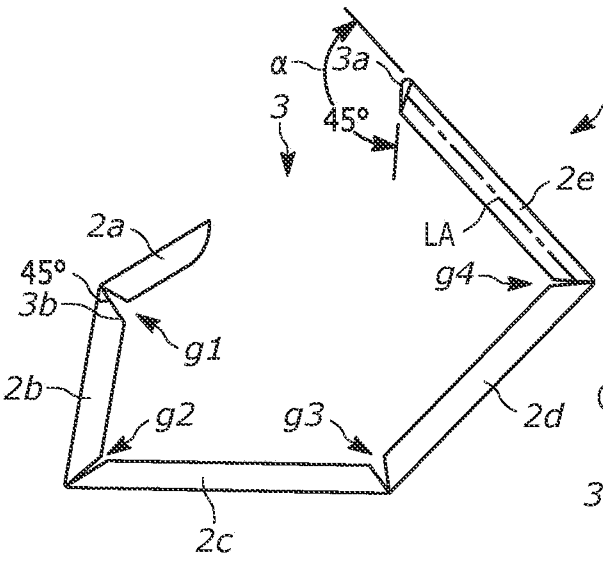
FIG. 1A
(PRIOR ART)
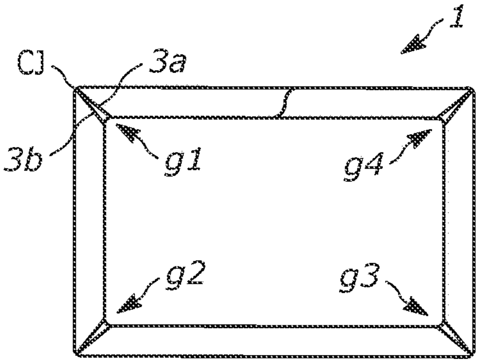
FIG. 1B
(PRIOR ART)
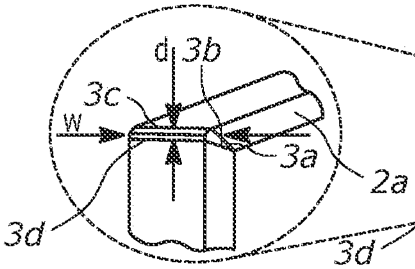
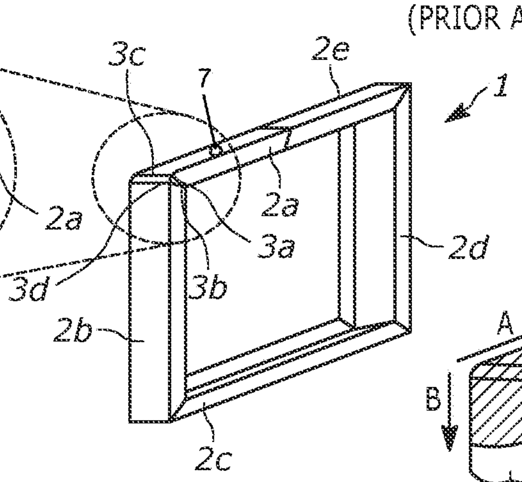
FIG. 1D
(PRIOR ART)
FIG. 1C
(PRIOR ART)
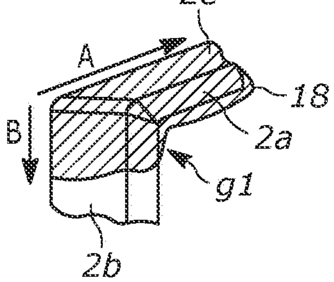
FIG. 1E
(PRIOR ART)

SPACER FRAME WITH RISING LOCKING MEMBER

CROSS REFERENCES TO RELATED APPLICATIONS

The present application claims priority under 35 U.S.C. § 119(e) to currently pending U.S. Provisional Patent Application Ser. No. 63/066,934 filed Aug. 18, 2020 entitled IMPROVED SPACER FRAME WITH RISING LOCKING MEMBER. The above-identified application is incorporated herein by reference in its entirety for all purposes.

FIELD OF DISCLOSURE

The present disclosure relates to an improved spacer frame with a rising locking member and more specifically, a strengthened spacer frame with a rising locking member, a method of making the rising locking member, and a fabrication process for the spacer frame with the rising locking member for use with an insulating glass unit ("IGU").

BACKGROUND

Insulating glass units ("IGUs") are used in windows to reduce heat loss from building interiors during cold weather. IGUs are typically formed by a spacer assembly sandwiched between glass lites. A spacer assembly usually comprises a frame structure extending peripherally about the unit, a sealant material adhered both to the glass lites and the frame structure, and a desiccant for absorbing atmospheric moisture within the unit. The margins of the glass lites are flush with or extend slightly outwardly from the spacer assembly. The sealant extends continuously about the frame structure periphery and its opposite sides so that the space within the IGUs is hermetic.

There have been numerous proposals for constructing IGUs. One type of IGU was constructed from an elongated corrugated sheet metal strip-like frame embedded in a body of hot melt or sealant material. Desiccant was also embedded in the sealant. The resulting composite spacer was packaged for transport and storage by coiling it into drum-like containers. When fabricating an IGU, the composite spacer was partially uncoiled and cut to length. The spacer was then bent into a rectangular shape and sandwiched between conforming glass lites.

Another IGU construction has employed tubular, roll formed aluminum or steel frame elements connected at their ends to form a square or rectangular spacer frame. The frame sides and corners were covered with sealant (e.g., butyl material, hot melt, reactive hot melt, or modified polyurethane) for securing the frame to the glass lites. The sealant provided a barrier between atmospheric air and the IGU interior, which blocked entry of atmospheric water vapor. Particulate desiccant deposited inside the tubular frame elements communicated with air trapped in the IGU interior to remove the entrapped airborne water vapor and thus preclude its condensation within the unit. Thus, after the water vapor entrapped in the IGU was removed internal condensation only occurred when the unit failed.

In some cases, the sheet metal was roll formed into a continuous tube, with desiccant inserted, and fed to cutting stations where "V" shaped notches were cut in the tube at corner locations. The tube was then cut to length and bent into an appropriate frame shape. The continuous spacer frame, with an appropriate sealant in place, was then assembled in an IGU.

Alternatively, individual roll formed spacer frame tubes were cut to length and "corner keys" were inserted between adjacent frame element ends to form the corners. In some constructions, the corner keys were foldable so that the sealant could be extruded onto the frame sides as the frame moved linearly past a sealant extrusion station. The frame was then folded to a rectangular configuration with the sealant in place on the opposite sides. The spacer assembly thus formed was placed between glass lites and the IGU assembly completed.

IGUs have failed because atmospheric water vapor infiltrated the sealant barrier. Infiltration tended to occur at the frame corners because the opposite frame sides were at least partly discontinuous there. For example, frames where the corners were formed by cutting "V" shaped notches at corner locations in a single long tube. The notches enabled bending the tube to form mitered corner joints; but afterwards potential infiltration paths extended along the corner parting lines substantially across the opposite frame faces at each corner.

Likewise, in IGUs employing corner keys, potential infiltration paths were formed by the junctures of the keys and frame elements. Furthermore, when such frames were folded into their final forms with sealant applied, the amount of sealant at the frame corners tended to be less than the amount deposited along the frame sides. Reduced sealant at the frame corners tended to cause vapor leakage paths.

In all these proposals the frame elements had to be cut to length in one way or another and, in the case of frames connected together by corner keys, the keys were installed before applying the sealant. These were all manual operations, which limited production rates. Accordingly, fabricating IGUs from these frames entailed generating appreciable amounts of scrap and performing inefficient manual operations.

In spacer frame constructions where the roll forming occurred immediately before the spacer assembly was completed, sawing, desiccant filling and frame element end plugging operations had to be performed by hand which greatly slowed production of units.

U.S. Pat. No. 5,361,476 to Leopold discloses a method and apparatus for making IGUs wherein a thin flat strip of sheet material is continuously formed into a channel shaped spacer frame having corner structures and end structures, the spacer thus formed is cut off, sealant and desiccant are applied and the assemblage is bent to form a spacer assembly. U.S. Pat. No. 5,361,476 is incorporated herein by reference in its entirety.

U.S. Pat. No. 7,448,246 to Briese et al. further describes the process of corner fabrication of a spacer frame. U.S. Pat. No. 8,720,026 to McGlinchy discusses additional methods of producing spacer frames. U.S. Pat. Nos. 9,428,953 and 11,008,801 to Briese et al. discusses methods of producing spacer frames as well as spacer frame assembly structures. U.S. Pat. Nos. 7,448,246, 8,720,026, 9,428,953 and 11,008,801 are incorporated herein by reference in their entireties.

SUMMARY

One aspect of the disclosure comprises a spacer frame assembly having a substantially linear channel comprising two lateral walls connected by a base wall. The channel includes first and second ends that when assembled, includes at least three sides and corresponding corners between each of the sides. The linear channel further includes a nose portion of the first end and a receiving portion of the second end having a channel for receiving the nose portion. The nose portion comprising a first undulation in the first end and the receiving portion comprising a second undulation in the second end, the first and second undulations nesting when the ends are in an assembled position.

Another aspect of the disclosure comprises a spacer frame assembly having a substantially linear channel comprising two lateral walls connected by a base wall, the channel having first and second ends that when assembled, includes at least three sides and corresponding corners between each of the sides. The assembly further includes a nose portion of the first end and a second receiving portion of the second end, the receiving portion having a channel for receiving the nose portion of the connecting structure and a tab stiffener extending transversely about the base wall of the nose portion that provides anti-buckling strength to the spacer frame.

While another aspect of the disclosure includes a method for manufacturing a spacer frame assembly, the method comprising the steps of: providing an elongated metal strip; providing a stamping station comprising at least one die set and a controller; forming at least three corners by the at least one die set controlled by the controller; forming a connecting portion of the elongated metal strip by the at least one die set controlled by the controller; forming a nose portion of the elongated metal strip by the at least one die set controlled by the controller; and forming a first undulation in the nose portion and a second undulation in the connecting portion such that the first and second undulations nest when the nose portion and the connecting portion are in an assembled position.

In yet another aspect of the present disclosure includes a method for forming a spacer frame assembly, the method comprising the steps of: providing an elongated channel for folding into a geometric shape, the elongated channel having two parallel walls connected by a base wall, the channel having a first and second end, the first end terminating in a connector structure having a first undulation, the second end terminating in a connecting structure having a second undulation; folding the elongated channel into the geometric shape; and inserting the connector structure into a linear passage portion of the connecting structure sufficient to engage a nesting arrangement between the connector structure and connecting structure, wherein the first and second undulations are coupled to form an assembled position.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 1A is an elevation construction view of a conventional spacer frame as constructed in prior art;

FIG. 1B is an elevation assembled view of the spacer frame of FIG. 1A;

FIG. 1C is a perspective assembled view of the spacer frame of FIG. 1A;

FIG. 1D is a magnified view of the assembled view of a portion of the spacer frame of FIG. 1C;

FIG. 1E is a perspective assembled view of the spacer frame of FIG. 1A, illustrating a required application of sealant;

Figure 2:
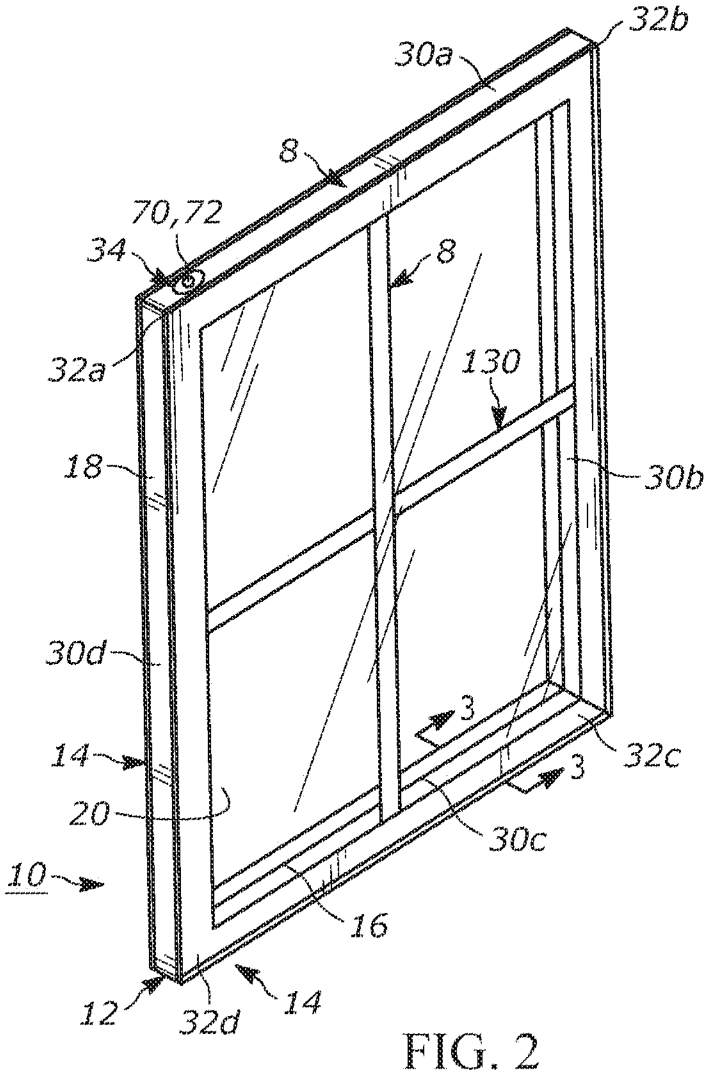
FIG. 2 is a perspective view of an insulating glass unit including glass lites.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to a spacer frame with a rising locking member and more specifically, a spacer frame with a rising locking member, a method of making the rising locking member, and a fabrication process for the spacer frame with the rising locking member for use with an insulating glass unit ("IGU").

The drawing figures and following specification disclose a method and apparatus for producing elongated window spacer frames 1 and 12 and window components 8 (see FIGS. 1A-1E and 2) used in IGUs 10. Examples of elongated window components include spacer frame assemblies 1, 12 and muntin bars 130 that form parts of the IGUs 10. The IGU components 8 are formed in one example embodiment from a production line, which forms sheet metal ribbon-like stock material into muntin bars and/or spacers carrying sealant and desiccant for completing the construction of IGUs. It should be appreciated that other materials, such as plastics, steel, and polymers, could be used to make the spacer frame 1 and/or 12 and the components 8.

Illustrated in FIGS. 1A-1E is a spacer frame 1 fabricated for IGUs. The spacer frame 1 is typically fabricated from an elongated metal strip and roll-formed into the orientation shown. The spacer frame 1 includes five different legs, 2*a*, 2*b*, 2*c*, 2*d*, and 2*e*. Leg 2*a* is a tab that when the spacer frame 1 is assembled is inserted into leg 2*e* to form a corner juncture or connection at CJ. Legs 2*b*-2*e* make up the four sides of the spacer frame 1. When the spacer frame 1 is bent from a linear strip into the four-sided frame (as illustrated by the transition from FIGS. 1A-1B) the leg 2*e* includes a chamfered end 3, typically as an angle $\alpha$ of 45 degrees from a longitudinal axis "LA" that extends along the center of leg 2*e*. This allows the tab leg 2*a* to be completely inserted into leg 2*e* until end sides 3*a* and 3*c* (see FIG. 1D) of the leg 2*e* bottom out on corresponding ends 3*b* and 3*d* to form corner juncture CJ. The insertion of the tab leg 2*a* into the leg 2*e* aligns apertures 7 in the tab leg and leg. Further discussion of the fabrication process of the spacer frame is discussed in U.S. Pat. No. 5,361,476 to Leopold, which is incorporated herein by reference in its entirety.

In the assembled position, the spacer frame 1 includes four gaps g1, g2, g3, and g4. The gap g1 is formed by the legs 2*a* and 2*b* and the passage the sliding of leg 2*e* over the leg 2*a* at end 3 of the corner juncture CJ. FIG. 1*e* illustrates the passage of hot melt or sealant 18 along directions A and B on the the spacer frame 1 such that the corner juncture CJ is sealed along two directions, over the entire profile of the spacer frame.

Figure 2A:
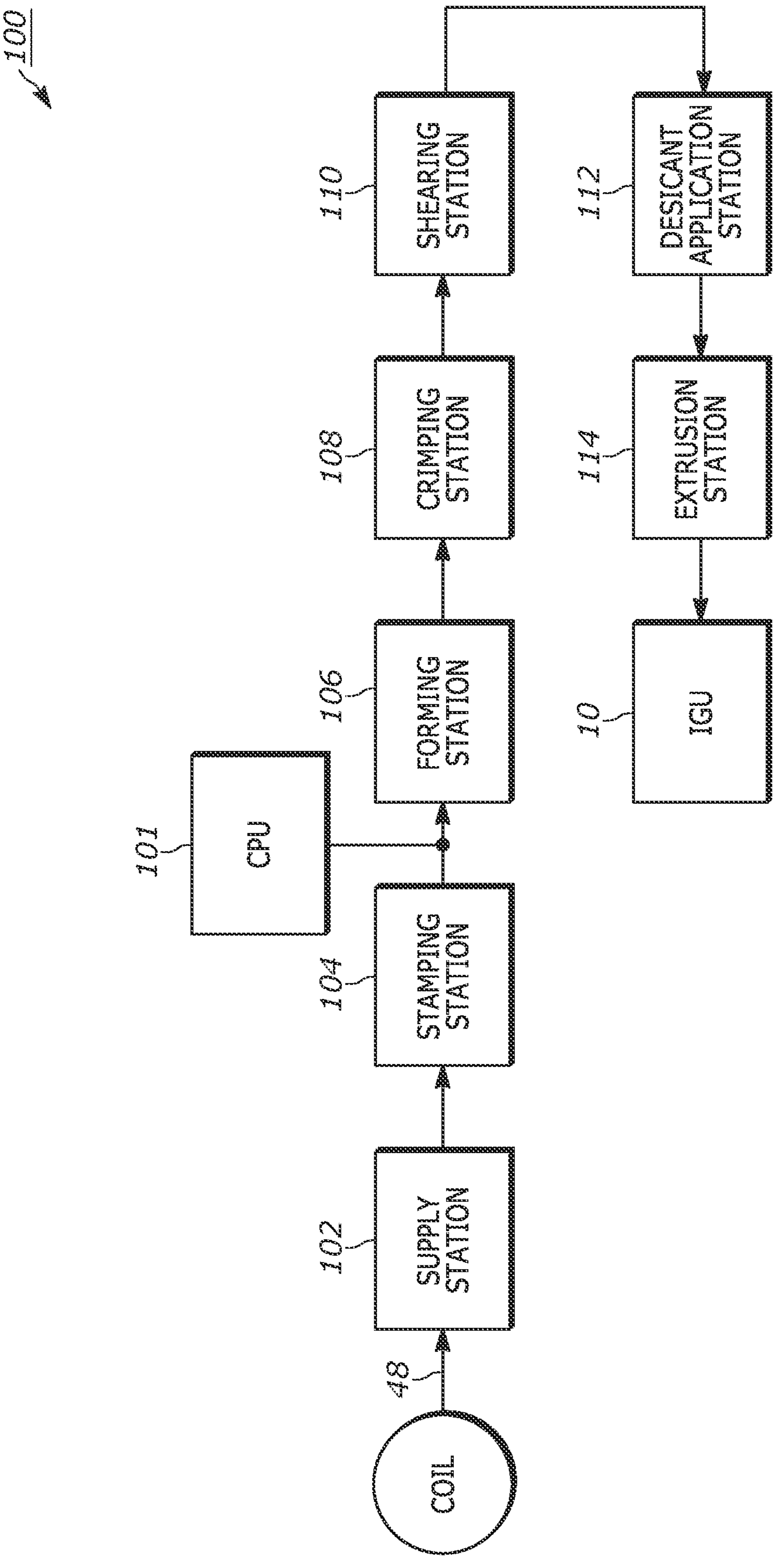
FIG. 2A (Prior Art)
FIG. 2A is a schematic block diagram of a production line for manufacturing a spacer frame in accordance with one example embodiment of the present disclosure.

Illustrated in FIG. 2A is a schematic block diagram of a production line for manufacturing a spacer frame and insulating glass unit as further described in U.S. Pat. No. 7,610,681, which is incorporated herein by reference in its entirety. The production line 100 may be used to fabricate the insulating glass units 10 and spacer frame assemblies 1, 12 of the present disclosure. A stock strip 48 of material is fed endwise from a coil from a supply station into the production line 100 and substantially completed elongated window components 8 emerge from the other end of the line.

The production line 100 comprises a stock supply station 102, a stamping station 104 where various notches, hole indentations, apertures, projections, undulations, lines of weaknesses, and tab profiles are punched into flat stock 48, a forming station 106 where the flat stock 48 is roll formed to make a u-shaped channel 33, a crimping station 108 where corners are bent and swaging is performed on the tab portion of the u-shaped channel, a shearing 110 station where the individual spacer frames are separated from the flat stock and cut to length and/or apertures and/or projections are stamped, a desiccant application station 112 where desiccant is applied between glass lites and the interior region formed by the lites and spacer frame assembly, and an extrusion station 114 where sealant is applied to the yet to be folded frame.

With reference to the operation of the stamping station 104, dies on opposite side of the stock strip 48 are driven into contact with the metal strip by an air actuated drive cylinder enclosed within the stamping station. In the illustrated embodiment, two air actuated cylinders drive a die support downward, moving spaced apart dies into engagement with the stock strip 48 to form the punch strip 36 (see FIGS. 4A-4C), which is backed by an anvil in the region of contact with the dies. In one example embodiment, a mandrel punches down through the stock strip 48 (see FIGS. 4A-4C) to form apertures 208, 206 and punches into the strip to deform the strip to form projections and undulations 200, 202, 204. The projections are shaped based upon an imprint shape of the mandrel and the anvil region opposite the mandrel.

Due to the need to fabricate spacer frame assemblies 12 of different widths relative to the lateral walls, 42, 44, the dies are movable with respect to each other so that the region of contact between die and stock strip 48 is controlled. Similarly, when a connecting structure 35 comprising a nose portion or tab 34 of the spacer frame assembly 12 is formed, separate dies on opposite sides of the punch strip 36 engage the punch strip 36 48 at controlled locations to form the nose profile seen in FIG. 4A. When the width of the spacer frame between the lateral walls 42, 44 changes the relative position of lateral walls, the two dies are also adjusted. In the exemplary embodiment, stamping of the connecting structure 35 occurs at a separate time from stamping of the corners at the notches 50. Stated another way, the four corners 32 are formed by a first die set controlled by controller 101 that also controls each station of the production line 100 and the connecting structure 35 is formed at another time by a separated air cylinder drive that moves a separate die pair into contact with the punch strip 36. In one example embodiment, the separated air cylinder drive also forms aperture projections 208, 206 and undulations 200, 202, and 204. Coordination of these separate actuations is controlled by movement of the punch strip 36 through the stamping station 104 to appropriate positions for forming the corners and the connecting structure 35 of the spacer frame.

Figure 3:
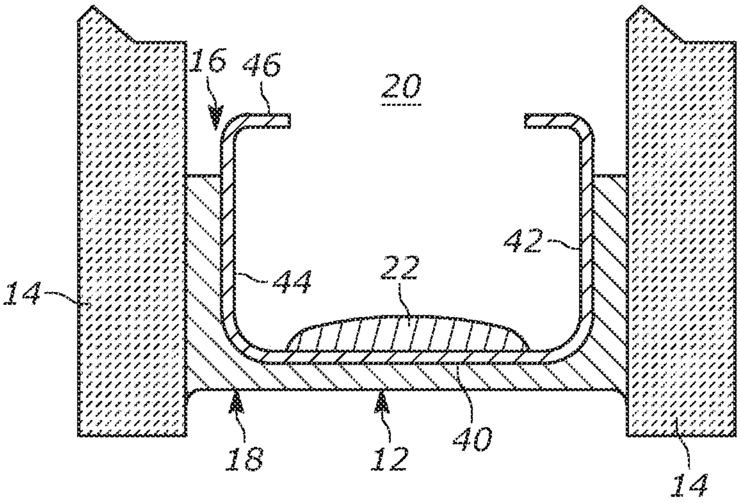
FIG. 3 is a cross sectional view seen approximately from the plane indicated by the line 3-3 of FIG. 2.

An insulating glass unit 10 illustrated in FIG. 2 is constructed using the method and apparatus further described in FIG. 2A as discussed above and in U.S. Pat. Nos. 8,720,026 and 7,448,246, which are both incorporated herein by reference in their entireties. In FIG. 2, the IGU 10 comprises a spacer frame assembly 12 sandwiched between glass sheets, or lites, 14. The spacer frame assembly 12 comprises a frame structure 16, sealant material 18 for hermetically joining the frame to the lites 14 to form a closed space 20 within the unit 10 and a body 22 of desiccant in the space 20, as illustrated in FIG. 3. The insulating glass unit 10 is illustrated in FIG. 2 as in condition for final assembly into a window or door frame, not illustrated, for ultimate installation in a building. The unit 10 illustrated in FIG. 2 includes muntin bars 130 that provide the appearance of individual window panes. The insulating glass unit with spacer frame 12 can be used with two spacer frames to form triple IGUs, i.e. with three glass lites as further describe in U.S. Pat. No. 9,416,583 that is assigned to the assignee of the present disclosure. U.S. Pat. No. 9,416,583 Patent is incorporated herein by reference.

The assembly 12 maintains the lites 14 spaced apart from each other to produce the hermetic insulating "insulating air space" 20 between them. One of ordinary skill in the art would appreciate that the assembly 1, of FIGS. 1A-1E, or another assembly embodiment 10 could also be used to maintain the lites 14 spaced apart from each other. The frame structure 16 and the sealant body 18 co-act to provide a structure, which maintains the lites 14 properly assembled with the space 20 sealed from atmospheric moisture over long time periods during which the unit 10 is subjected to frequent significant thermal stresses. The desiccant body 22, as illustrated in the example embodiment of FIG. 3, removes water vapor from air, or other volatiles, entrapped in the space 20 during construction of the unit 10.

The sealant body 18 both structurally adheres the lites 14 to the spacer assembly 12 and hermetically closes the space 20 against infiltration of airborne water vapor from the atmosphere surrounding the unit 10. The illustrated body or sealant 18 is formed from a number of different possible materials, including for example, butyl material, hot melt, reactive hot melt, modified polyurethane sealant, and the like, which is attached to the frame sides and outer periphery to form a U-shaped cross section.

The spacer frame assembly 12 extends about the unit periphery to provide a structurally strong, stable spacer for maintaining the lites 14 aligned and spaced while minimizing heat conduction between the lites via the frame. In one example embodiment, the frame structure 16 comprises a plurality of spacer frame segments, or members, 30*a*-30*d* connected to form a planar, polygonal frame shape, element juncture forming frame corner structures 32*a*-32*d*, and the connecting structure 35 for joining opposite frame element ends or tail 30*d* to complete the closed frame shape (see FIG. 6).

Each frame member 30 is elongated and has a channel shaped cross section defining a peripheral wall 40 and first and second lateral walls 42, 44. See FIGS. 2, 3, 4D, 4E, 5, 6, and 7-8. The peripheral wall 40 extends continuously about the unit 10 except where the connecting structure 35 joins the frame member end 30*d*. The lateral walls 42, 44 are integral with respective opposite peripheral or base wall 40 edges. The lateral walls 42, 44 extend inwardly to form a channel 33 with the peripheral wall 40 in a direction parallel to the planes of the lites 14 and the frame structure 16. The illustrated frame structure 16 has stiffening flanges 46 formed along the inwardly projecting lateral wall 42, 44 edges. The lateral walls 42, 44 add rigidity to the frame member 30 so it resists flexure and bending in a direction transverse to its longitudinal extent. The flanges 46 stiffen the lateral walls 42, 44 further so they have an increased resistance to bending and flexure transverse to their longitudinal extents.

Figure 4A:
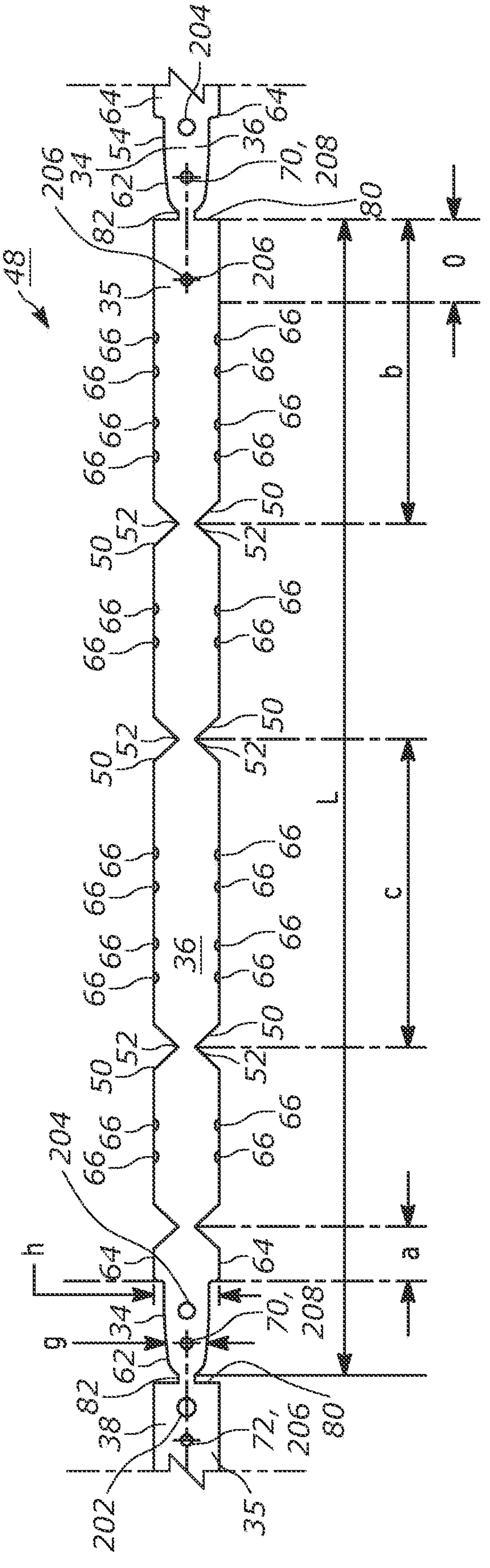
FIG. 4A is a plan view of flat stock after a punching operation that will be formed into one or more spacer frame assemblies before the flat stock is roll formed and before hot sealant applied in accordance with one example embodiment of the present disclosure.
Figure 4B:
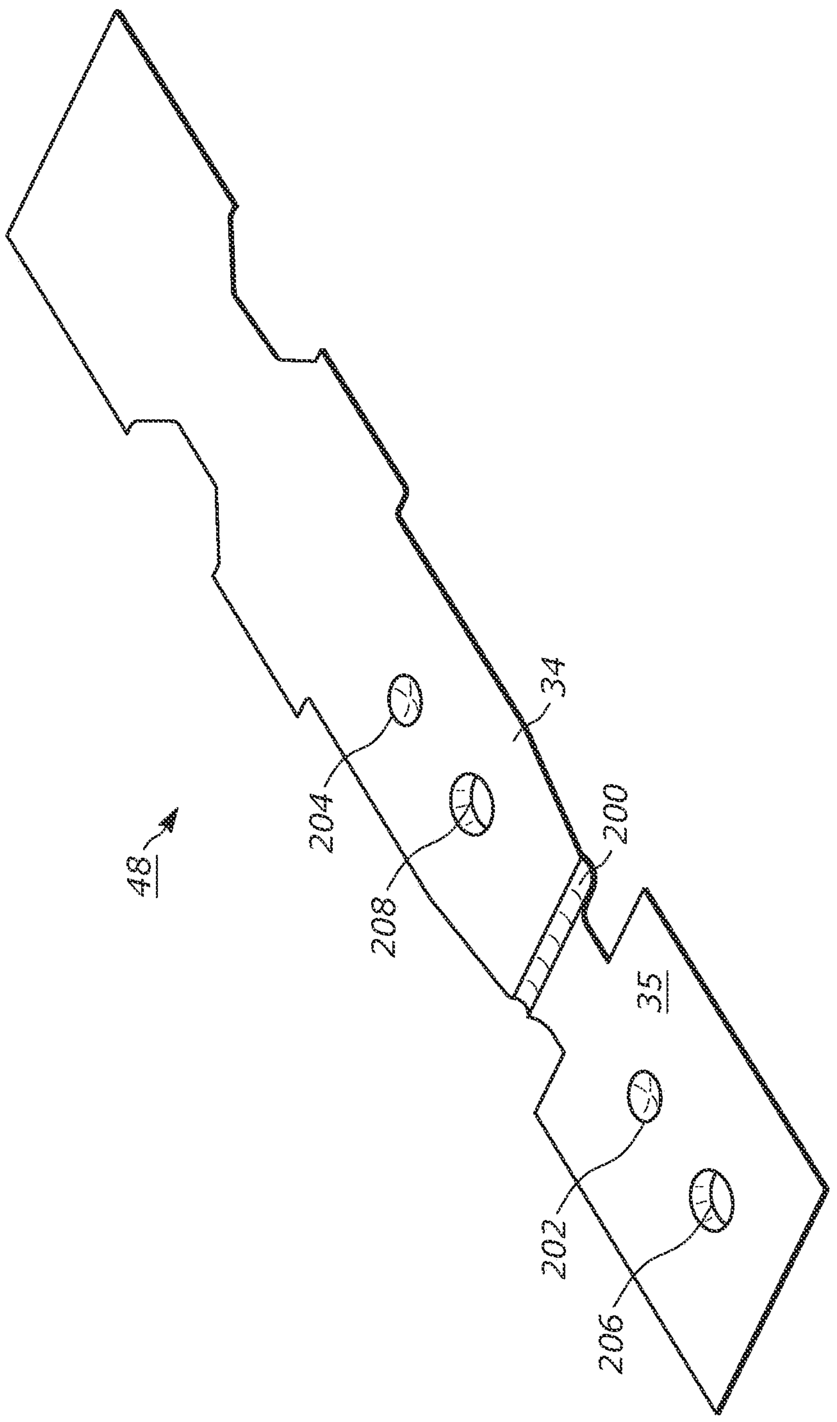
FIG. 4B is an upper perspective view of FIG. 4A in accordance with one example embodiment.
Figure 4C:
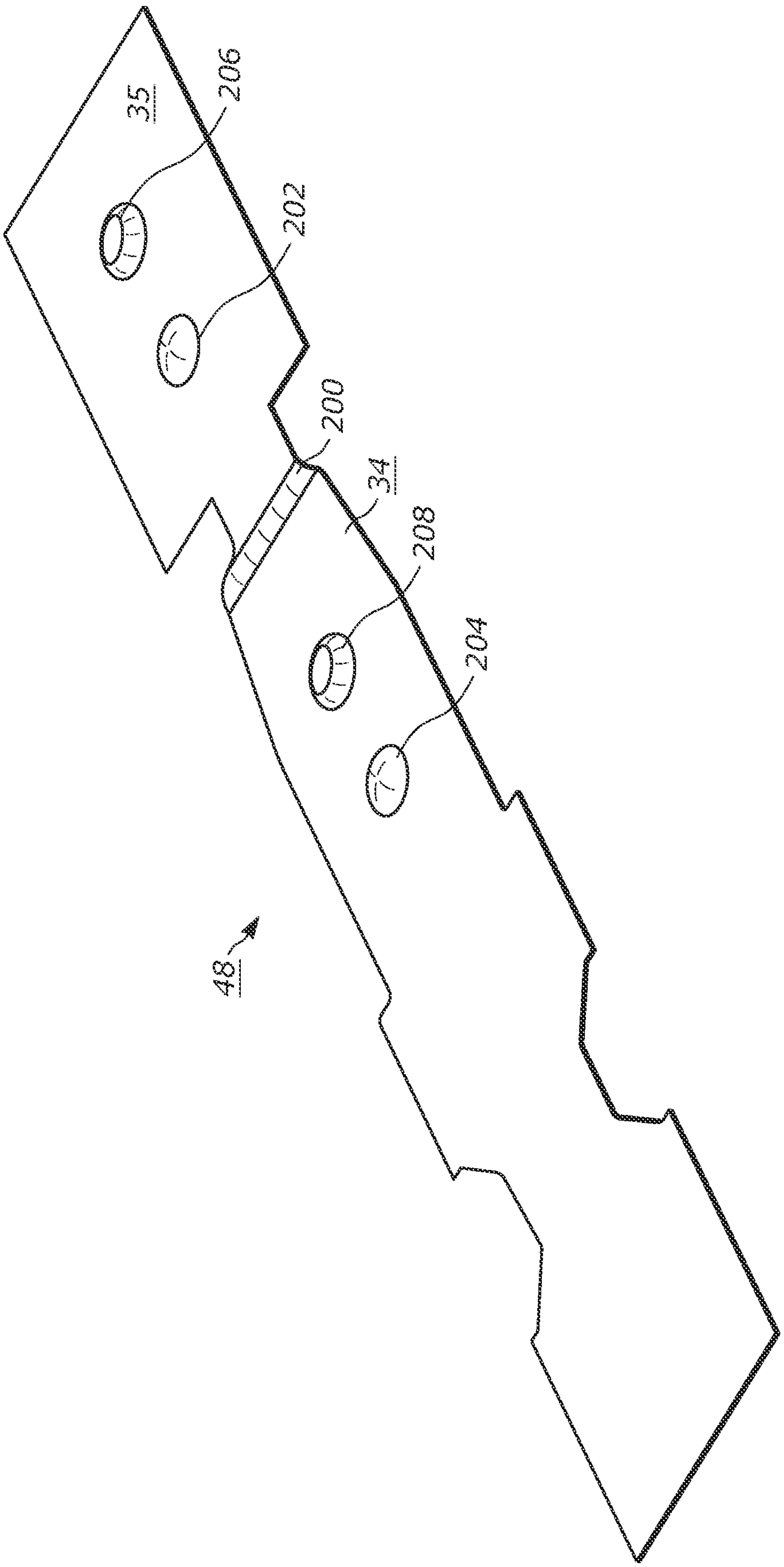
FIG. 4C is a lower perspective view of FIG. 4B in accordance with the example embodiment of FIG. 4B.

In the illustrated example of FIGS. 4A-4C, the frame assembly 12 is initially formed as a continuous straight metal stock strip 48 constructed from a thin ribbon of metal or flat stock 48. One example of suitable metal includes stainless steel material having a thickness of 0.006-0.010 inches. Other materials, such as galvanized, tin plated steel, or aluminum, plastic, or foam can also be used to construct the stock strip 48 without departing from the spirit and scope of the present disclosure.

Illustrated in FIGS. 4A-4C is the continuous metal ribbon or flat stock 48 after it is passed through a stamping station and punched by a number of dies to form notches 50 and weakening zones 52 for corner folds 32, clip notches 66 (used in securing muntin bars), connecting structure 35, a nose 62, gas fill apertures 70, 72, projections 208, 206 (see, for example, FIGS. 8, 9) and end cut 80. A punch strip 36 of flat stock forms a single spacer frame assembly 12 as illustrated in repeating sections by dimension "L" from the continuous stock strip 48. The punch strip 36 is eventually sheared to make a spacer frame assembly 12 at end 80 and the nose 62, leaving scrap piece 82. Alternatively, the punching or shearing operation is a single hit operation in which the width of the shear equals that of scrap piece 82, leaving no scrap or need for a double hit operation. Further discussion relating to the shearing or punching operation is discussed in U.S. Pat. No. 8,720,026, which is incorporated herein by reference.

The gas fill apertures 70, 72 comprise funnel-shape holes 206, 208 punched into the metal stock strip 48 at stamping station 104. The funnel-shaped holes include a lower lock aperture 206 and an upper lock aperture that lock the ends of a spacer frame 12 together when assembled (see in phantom FIG. 6). The gas fill apertures 70, 72 are used to either inject the space 20 in the assembly 10 with a liquid and/or solid, or to evacuate the space.

The connecting structure 35 and stops 64 are formed by stamping dies at a stamping station 104 as described above. Shown in FIG. 4A, by dimension "g" in one example embodiment is a width of the connecting structure 35, which is smaller than the width of the stop 64 illustrated by dimension "h". In one example embodiment, the width of the connecting structure 35 shown by dimension "g" is one inch 1.00" and the width of the stops 64 shown by dimension "h" is one and three sixteenths of one inch 1.187". Thus, the difference between the width of the connecting structure 35 and stops 64 of the above example embodiment is approximately ninety-three thousands 0.093" of one inch from the outside edge of the stock strip 48 to an outside edge of the connecting structure.

Clip notches 66 are formed to support flexible clips that reside within the spacer frame assembly 12 and IGU once assembled. The flexible clips are used to support, for example, muntin bars as further discussed in U.S. Pat. No. 5,678,377, which is incorporated herein by reference. Notches 50 and weakening zones 52 are punched and crimped into the continuous stock strip 48 at stamping station 104, allowing for the formation of the corner structures 32. Further discussion of the punching and crimping operations is discussed in U.S. Pat. No. 7,448,246, which is incorporated by reference.

Figure 4D:
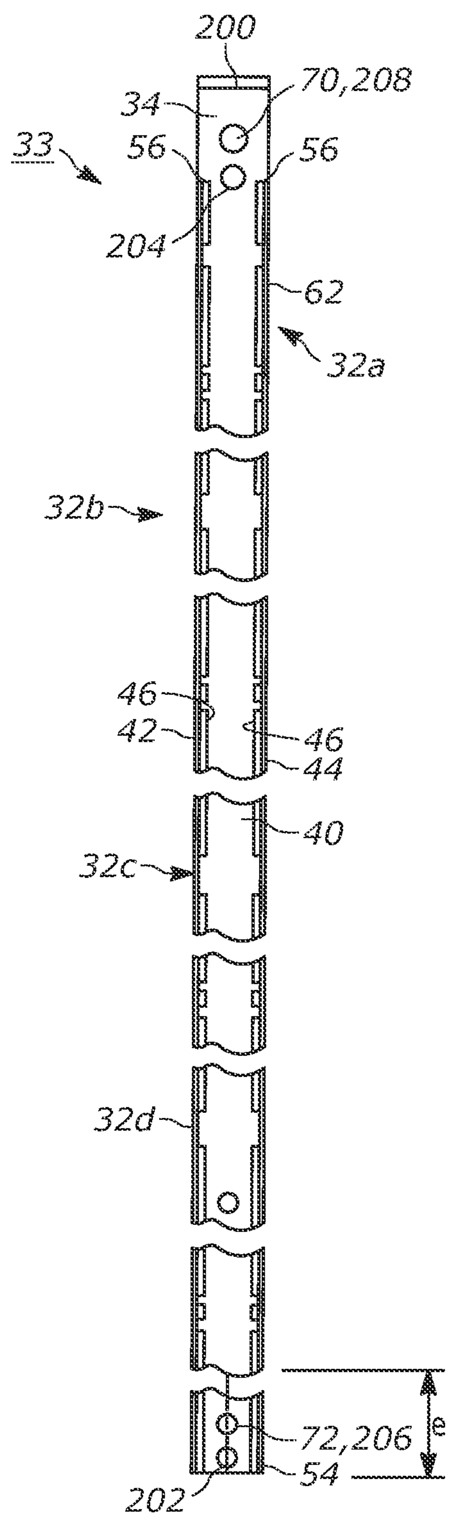
FIG. 4D is a plan view of the spacer frame assembly of FIG. 4A after a roll forming operation in an unfolded condition.
Figure 4E:
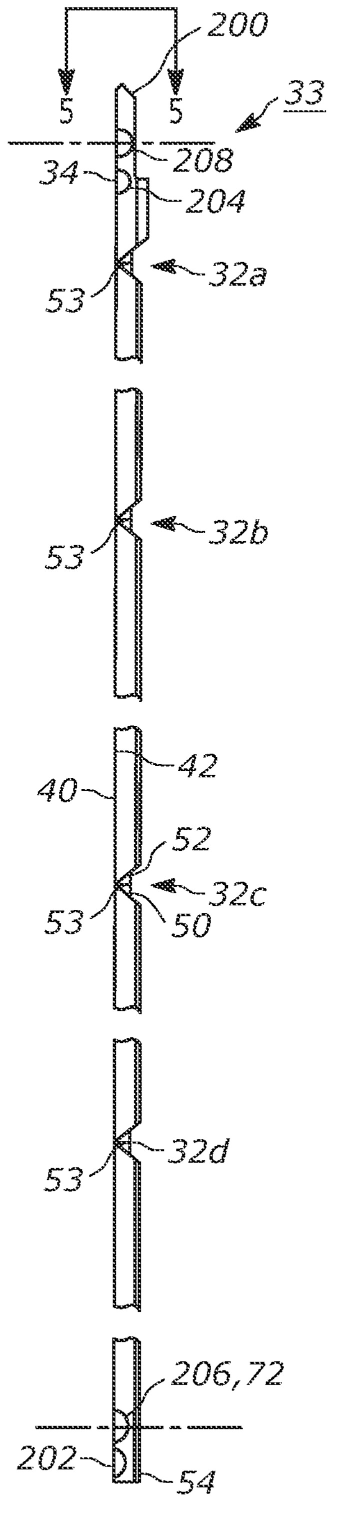
FIG. 4E is side elevation view of the spacer frame assembly of FIG. 4D.
Figure 5:
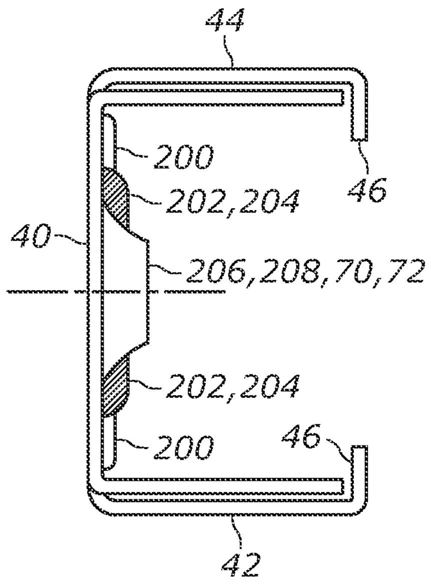
FIG. 5 is an enlarged end view of the spacer frame of FIG. 4A as seen approximately from the plane indicated by the line 5-5 of FIG. 4E.
Figure 7B:
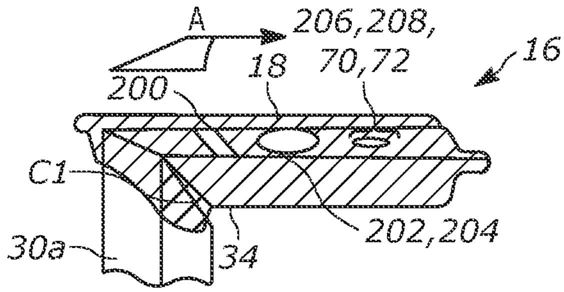
FIG. 7B is a partial perspective view of a spacer frame assembly constructed in accordance with another example embodiment.
Figure 8:
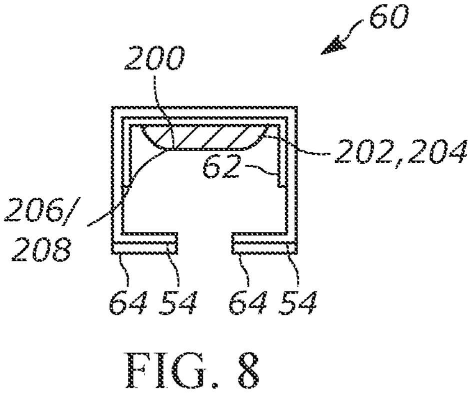
FIG. 8 is a section view of the assembled spacer frame after sectioning along the line 8-8 of FIG. 6, illustrating one example embodiment of the present disclosure.
Figure 7A:
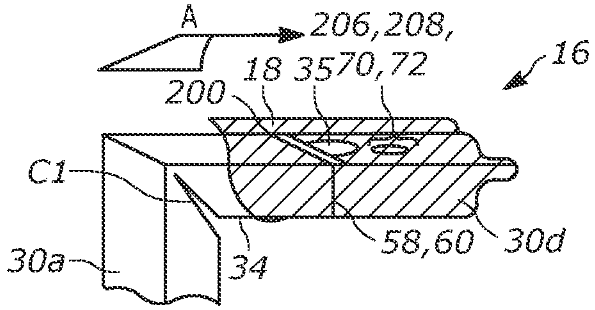
FIG. 7A is a partial perspective view of a spacer frame assembly of FIG. 6 in accordance with one example embodiment of the present disclosure.

Before the punch strip 36 is sheared from the continuous stock strip 48, it is roll formed to the configuration illustrated in FIGS. 4D, 4E, and 5, creating peripheral wall 40, lateral walls 42, 44, and stiffening flanges 46. In one example embodiment, the projections 71 forming the locking apertures 206 and 208 and/or undulations 200, 202, and 204 (see, for example, FIGS. 6B and 6C) are formed, as described above, after the roll forming operation. Further discussion as to the roll forming operation is discussed in U.S. Pat. No. 8,904,611, which is incorporated herein by reference. While yet in another example embodiment, the locking apertures 208, 206 and/or undulations 200, 202, 204.

While FIG. 5 illustrates locking apertures 206 and 208 and undulations 200, 202, and 204 projecting in a way that they are enclosed by, or within the lateral walls 42, 44 from the peripheral wall 40, it is also possible and within the spirit and scope of the present disclosure that such projecting locking apertures and undulations to be projecting to the outside or away from the lateral walls, or any combination thereof. However, in the illustrated example embodiment of FIG. 5, the frusto-conical shape of the locking apertures 206 and 208 as they project such that they are enclosed by or within the lateral walls 42, 44, allows for a fastener 210 (or head thereof) to be substantially flush with the peripheral wall 40, thus reducing the possibility for gas leaks from inside the IGU and a continuous or smooth application of sealant as its applied over the peripheral wall 40 and the fastener 210 without interruption.

Figure 6:
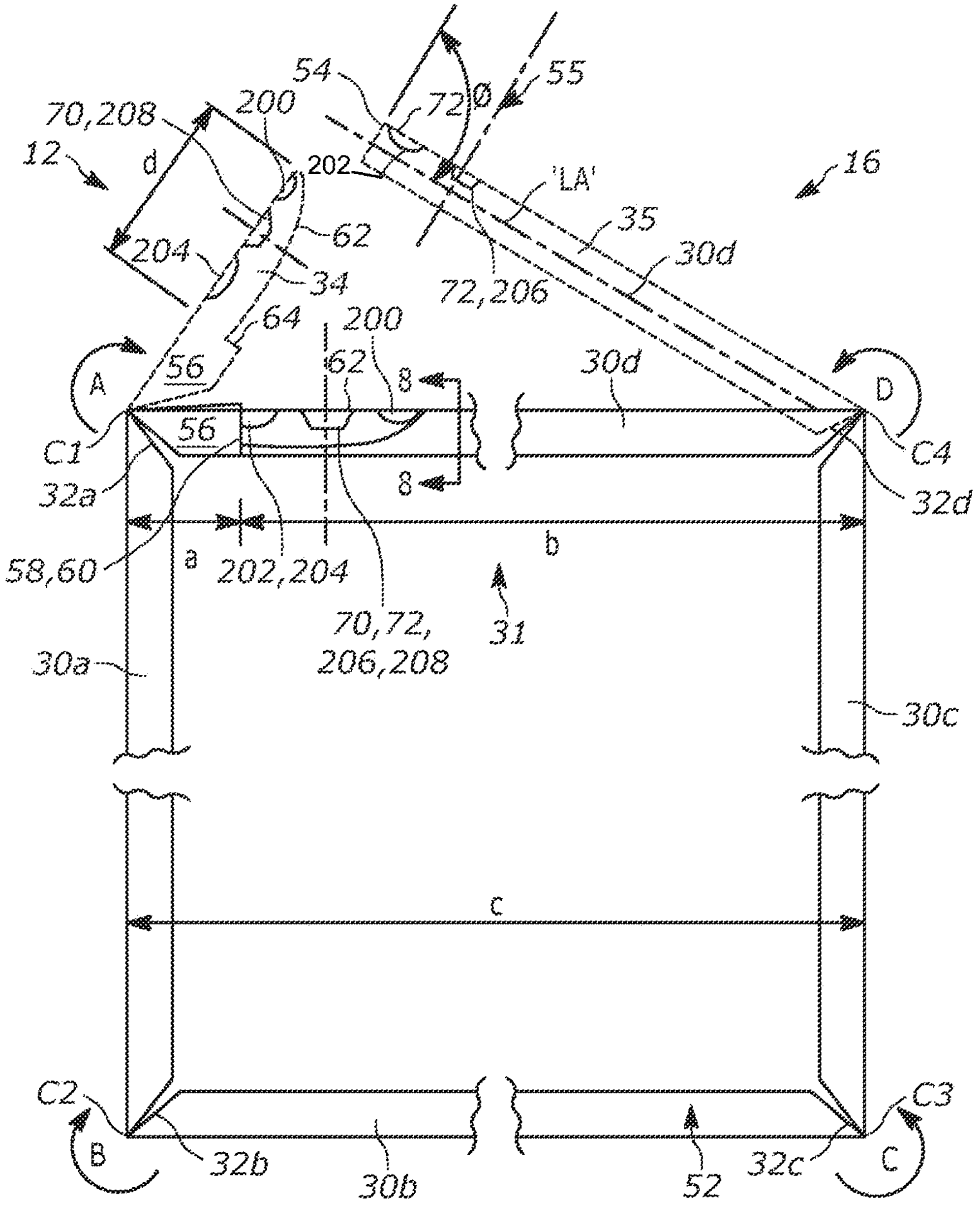
FIG. 6 is a front elevation view of a spacer frame forming part of the unit of FIG. 2 which is illustrated in a partially constructed condition in accordance with one example embodiment.
Figure 6A:
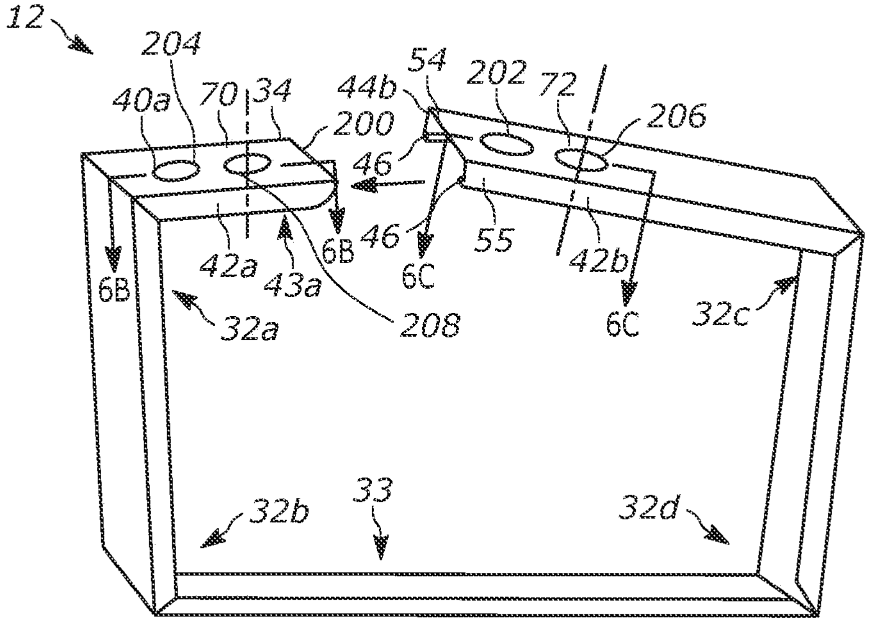
FIG. 6A is a front elevation view of the spacer frame of FIG. 6 in a disassembled condition.

The corner structures 32 are formed to facilitate bending the frame channel to the final, polygonal frame configuration in the unit 10 while assuring an effective vapor seal at the frame corners, as seen in FIGS. 2 and 6. The sealant body 18 is applied and adhered to the channel 33 before the corners are bent. The corner structures 32 initially comprise notches 50 and weakened zones 52 formed in the walls 42, 44 at frame corner locations. See FIGS. 4D-4E. The notches 50 extend into the lateral walls 42, 44 from the respective lateral wall edges. The lateral walls 42, 44 extend continuously along the frame 12 from one end to the other. The lateral walls 42, 44 are weakened at the corner locations because the notches 50 reduce the amount of lateral wall material and eliminate the stiffening flanges 46 and because the lateral walls are stamped to form a line of weakness 53 (see FIG. 4E) to weaken the spacer frame 12 at the corners 32*a*-32*d* and thus allow inward flexing as the spacer frame assembly is bent.

The connecting structure 35 is inserted into an opposite frame end 54 or leg member 30*d* when the spacer frame assembly 12 has been bent to its final configuration. That is, rotating the linear spacer frame assembly 12 segments or members 30 (from the linear configuration of FIGS. 4D and 4E) in the direction of arrows A, B, C, and D as illustrated in FIG. 6 and particularly, inserting a nose 62 of the connecting structure 35 into the opposite channel 55 formed at the opposite end 54 of segment 30*d* with concomitant rotation of the segments (arrows A-D). This concomitant rotation continues until the connecting structure 35 slides into the opposite channel 55 of segment 30*d* at the opposite end 54. In the illustrated example embodiment of FIG. 6, the opposite end 54 engages positive stops 64 in the connecting structure 35 forming a telescopic union 58 and lateral connection 60 to make a compound lateral leg 31.

The telescopic union 58 and lateral connection 60 are formed along the lateral leg 31 and spaced from the corner structures 32, which in the illustrated example embodiment of FIG. 6 is C1. When assembled, the telescopic union 58 maintains the frame 12 in its final polygonal configuration prior to assembly of the insulating glass unit 10. As in the illustrated example embodiment of FIG. 6, the compound lateral leg 31 has a length of dimensions "a" (first frame end 56 from the corner C1 to the end of the stop 64) plus "b" (the fourth frame segment or member 30*d*), which equals the length of dimension "c" (see FIG. 6), the length of a second and opposite side segment 30*b*. Dimension "b" in the illustrated example embodiment, is the length of segment 30*d* and dimension "a" is the length of the connecting structure 35 less the length of the nose 62 (dimension d) that is inserted into the opposite channel 55 formed in segment 30*d*.

Figure 9A:
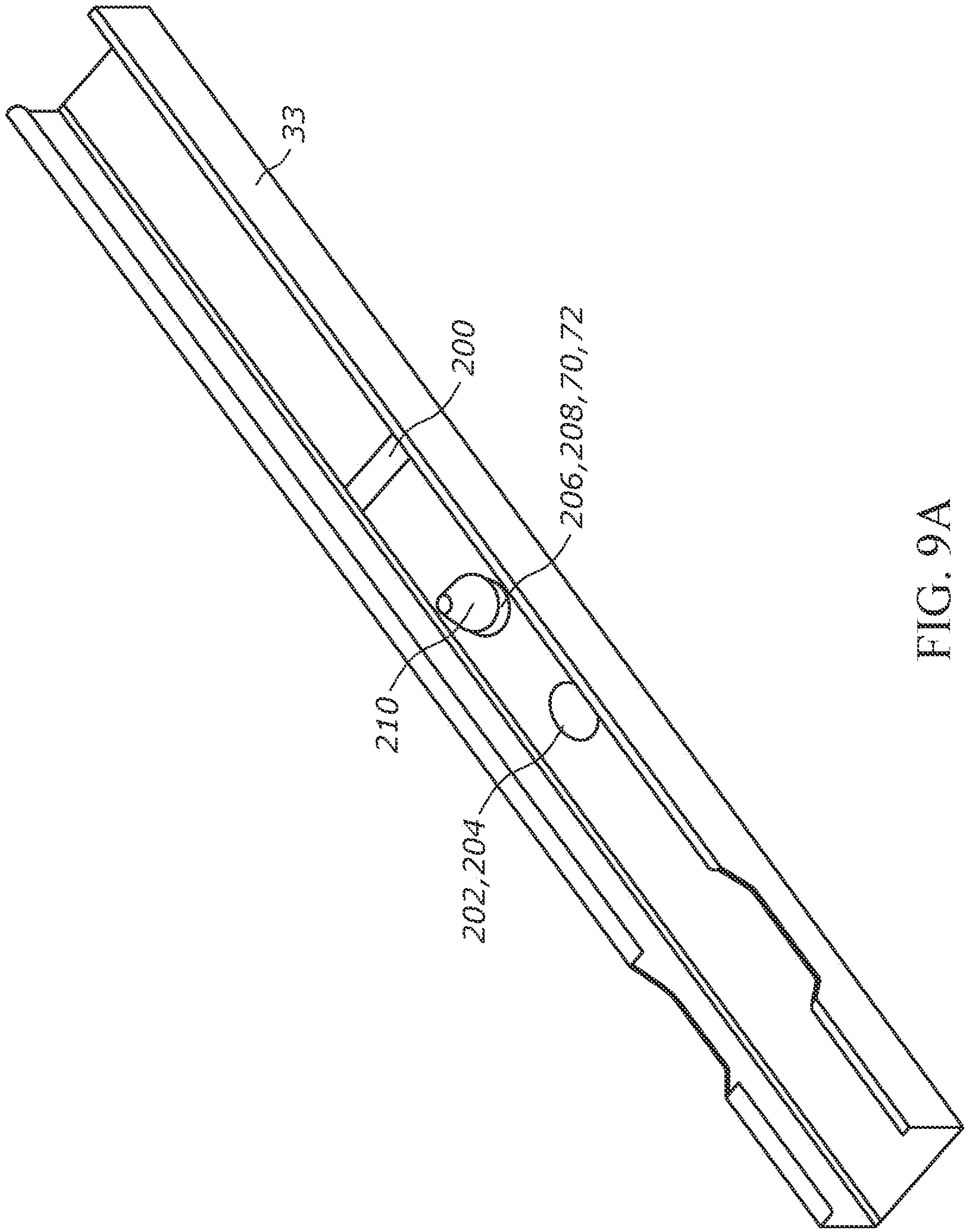
FIG. 9A is a partial lower perspective view of an assembled spacer frame in accordance with one example embodiment of the present disclosure.
Figure 9B:
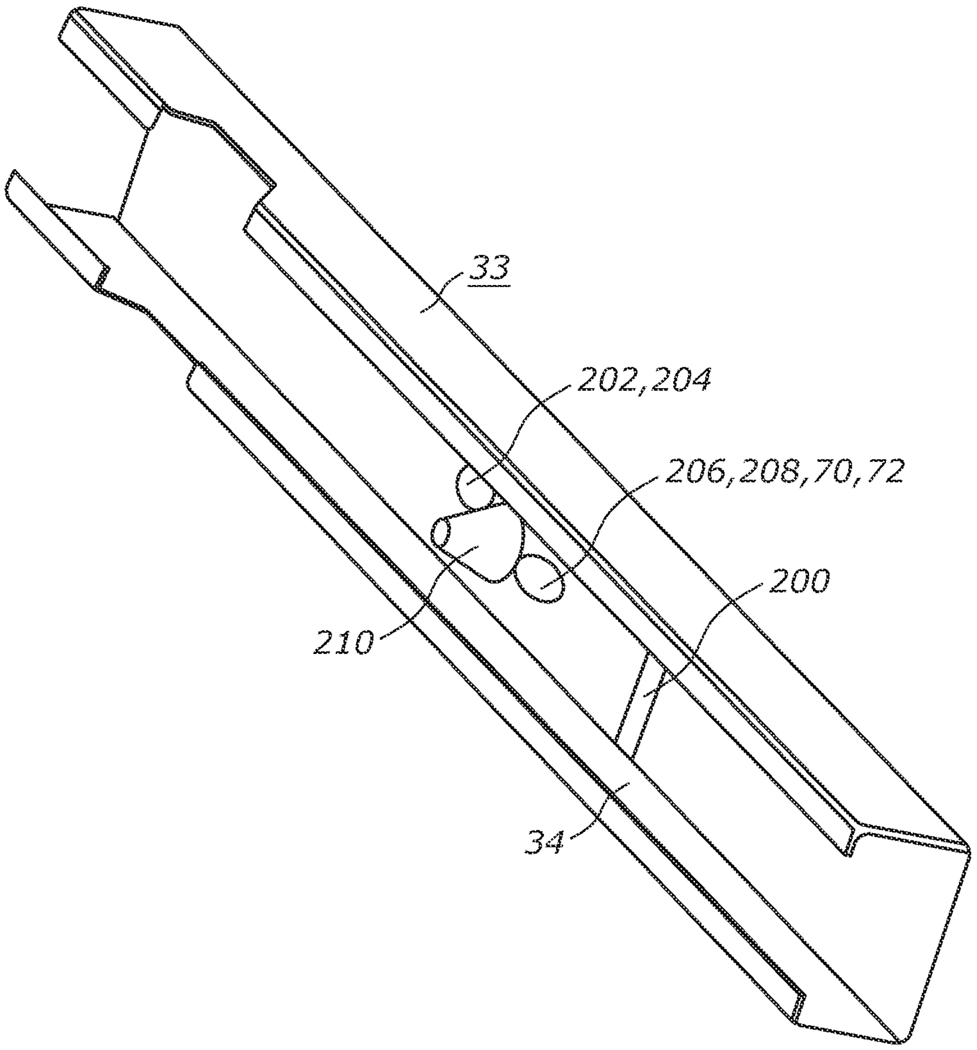
FIG. 9B is a second partial lower perspective view of the assembled spacer frame of FIG. 9A.
Figure 9C:
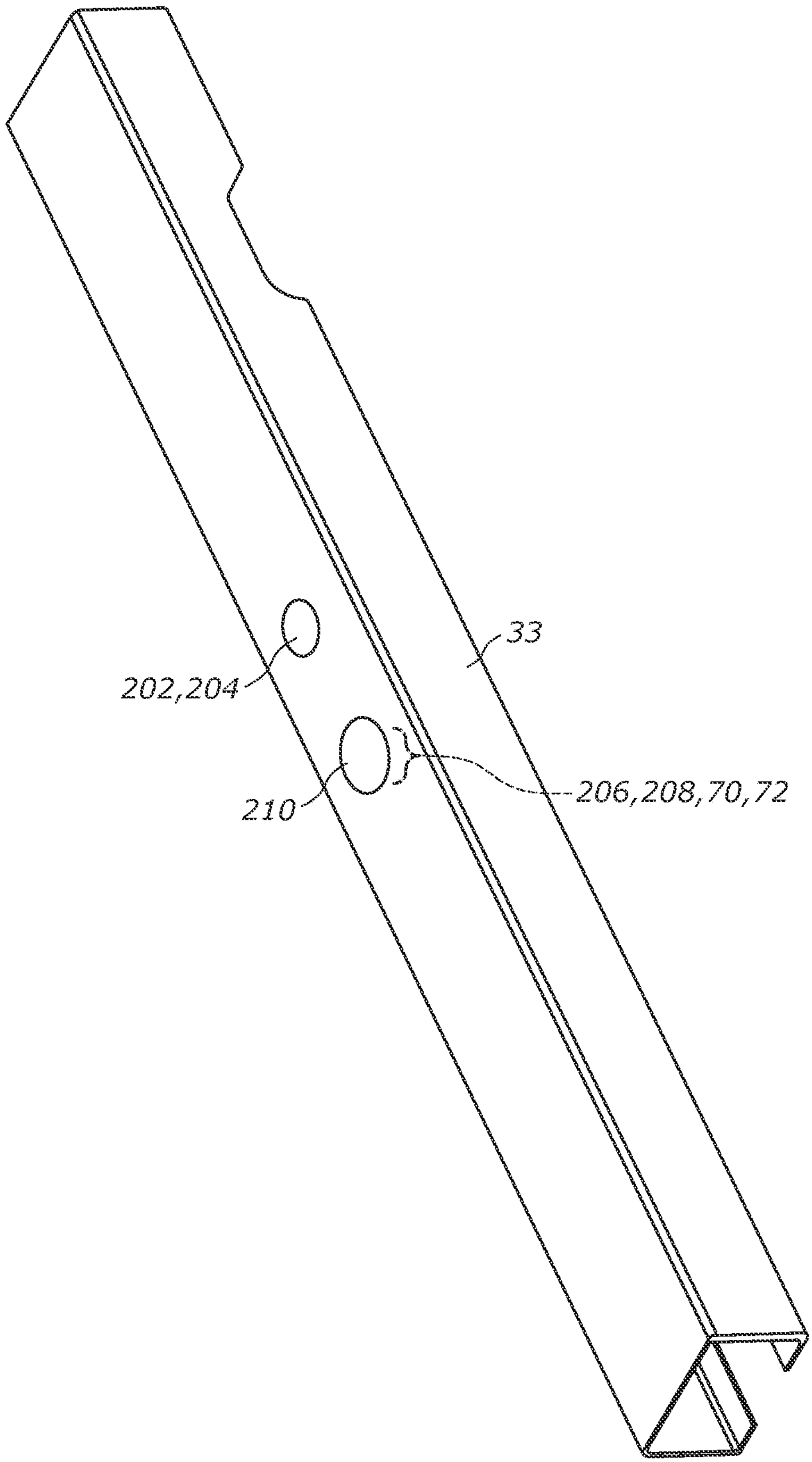
FIG. 9C is a partial upper perspective view of the assembled spacer frame of FIG. 9A.
Figure 10:
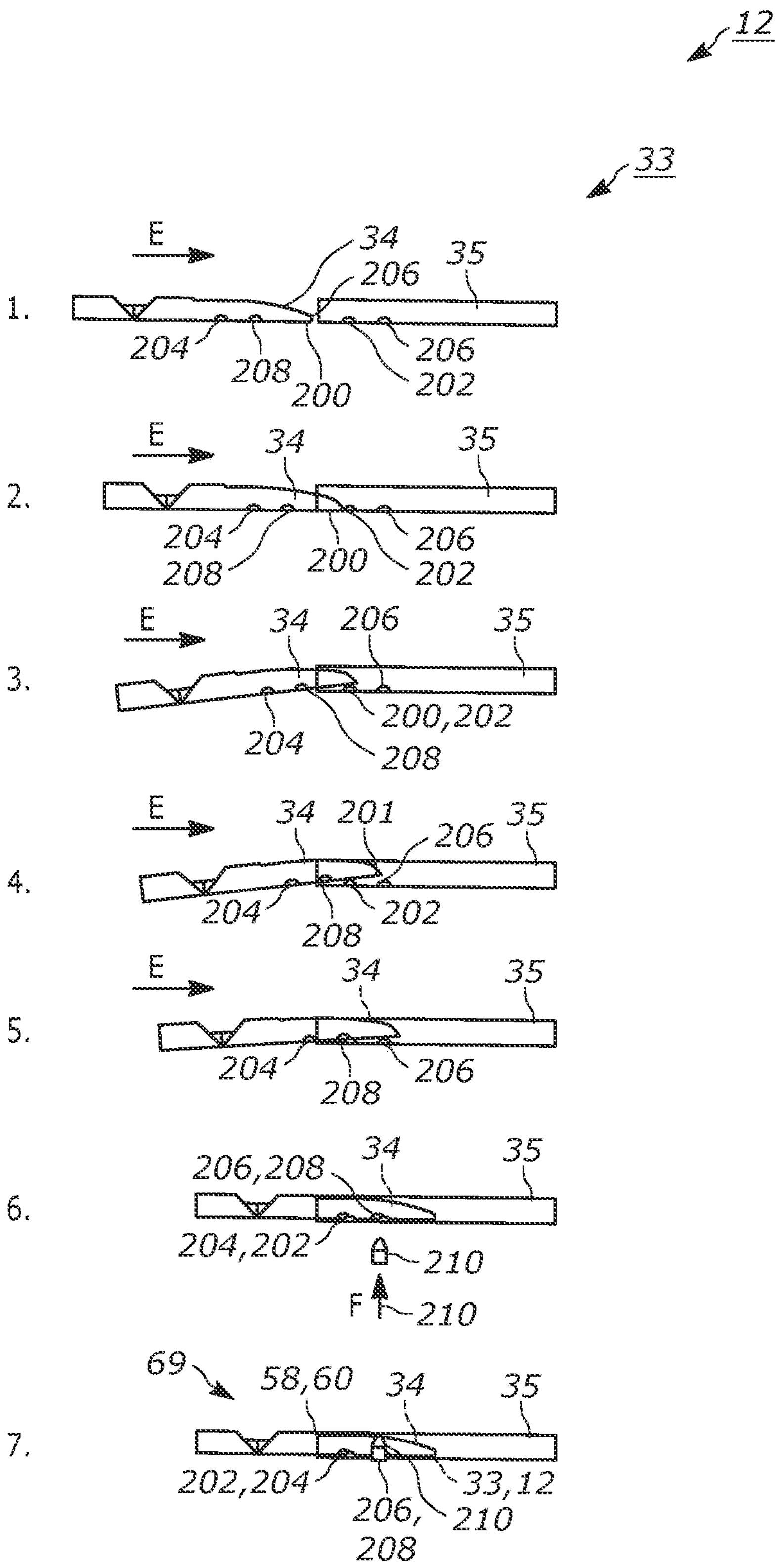
FIG. 10 is a schematic flow chart illustrating the assembly of spacer frame of FIGS. 4A-7A and FIGS. 8-9C in accordance with one example embodiment of the present disclosure.
Figure 11:
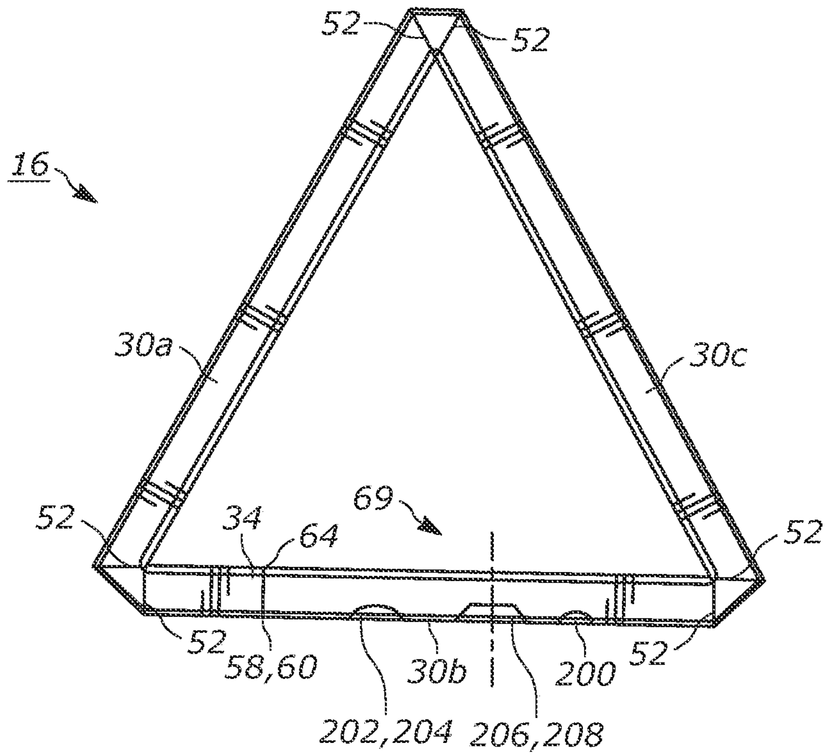
FIG. 11 is an elevation view of a spacer frame, illustrating an additional geometry of a spacer frame using the same attachment assemblies of the embodiments shown and described herein.
Figure 12:
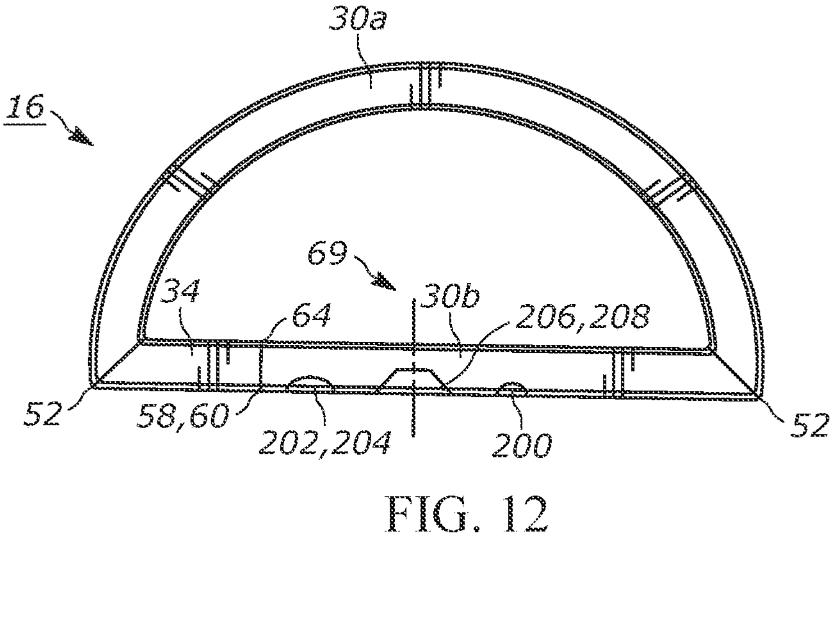
FIG. 12 is an elevation view of a spacer frame, illustrating an additional geometry of a spacer frame using the same attachment assemblies of the embodiments shown and described herein.

In the illustrated example embodiments, the connector structure 34 further comprises a first gas fill aperture 70 and corresponding second gas fill aperture 72 in the segment 30 d for housing a fastener 210, such as a rivet, scrivet, screw and the like (see FIGS. 9A-10). The locking members 206, 208 connect the opposite channel 55 comprising the opposite frame end 54 with the connecting structure 35. While the gas fill apertures 206, 70, 208, 72 provide a temporary vent for the evacuation of air or insertion of gas into the space 20 while the unit 10 is being fabricated. The funnel-shape lower and upper aperture locks 208, 206, secure the opposite frame end 54 with the connecting structure 35 such that separation from the end and connecting structure cannot occur absent an outside force once assembled even without the fastener 210.

In the illustrated example embodiment of FIGS. 7-12, a first projection 208 defined by the first gas fill aperture 70 is formed through the base wall 40*a* into the channel 33 and a second projection 206 defined by said second gas fill aperture 72 is formed in the base wall into the channel, wherein the first projection 208 interweaves (see FIG. 11) with the second projection 206 when assembled. The interweaving of the projections provides a friction connection 69. Stated another way second projection 206 nests with, or is seated within the first projection 208 to comprise the friction connection 69. The friction connection 69 is a responsive tactile connection, in that it provides to the assembler feedback if there is over-travel or under-travel when advancing one or both of the connecting structure 35 and the opposite channel 55 towards each other. That is, the friction during assembly remains high during under-travel until the interweaving of the projections 71, 206, and 208 is achieved to form the friction or responsive tactile connection 69. Once the interweaving is achieved, the friction significantly diminishes between the base wall 40*a* and the second projection 206. Similarly, if over-travel from the tactile connection 69 occurs, the friction significantly increases. This tactile response occurs because the second projection 206 rubs the base wall 40*a* (see FIGS. 10-11) of the connecting structure 35, until the tactile connection 69 is reached between the first and second projections 208, 206, respectively.

The apertures 70 and 72 are aligned because of the interweaving connection 69 of the first projection 208 and the second projection 206. The interweaving feature 69 reassures concentric alignment of the apertures 70, 72. Additionally, the concentric alignment of the gas fill apertures 70, 72 is further assured by one of the interaction of end 3*a* engaging the corner gap g1 at the corner juncture CJ, as illustrated in FIG. 1B, or the interaction of the opposite frame end 54 with the stop 64, as illustrated in FIG. 6, when such structures are present. Advantageously, the concentric alignment of the gas fill apertures 70, 72 is reassured based on the frictional tactile feedback connection 69 provided during assembly to the assembler, as described above, even without the telescopic union 58, or the lateral connection 60, as illustrated in FIG. 6, or even without engagement of the end 3*a* with the corner as illustrated in FIGS. 1A-1E, and FIG. 7B.

Figure 6B:
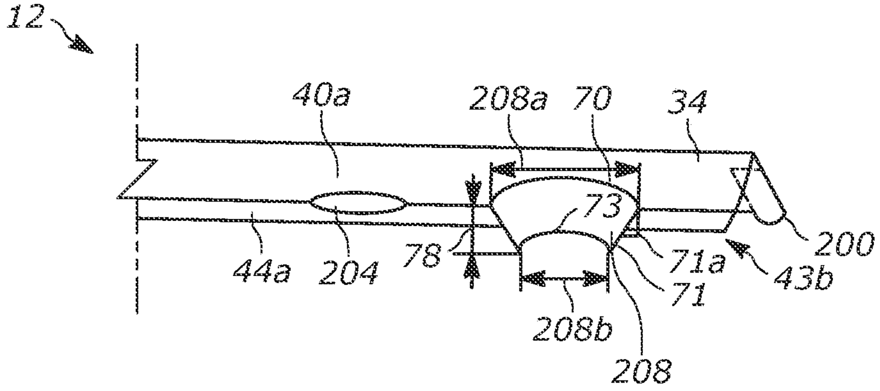
FIG. 6B is a portion of the spacer frame of FIG. 6A along sections lines 6B-6B of FIG. 6A.
Figure 6C:
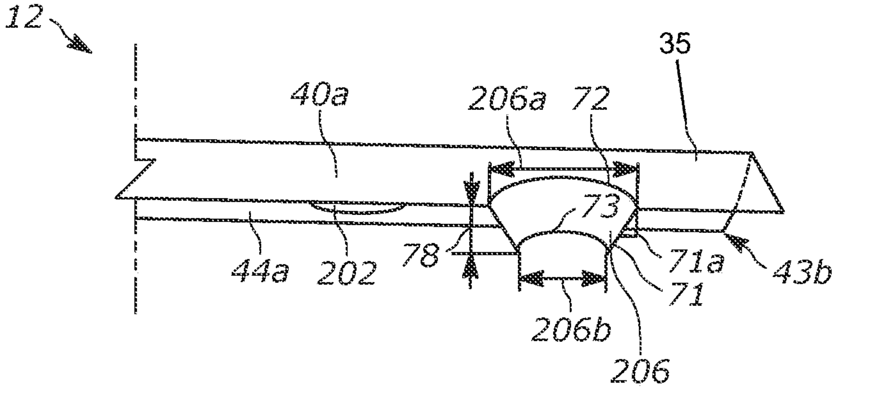
FIG. 6C is a portion of the spacer frame of FIG. 6A along sections lines 6C-6C of FIG. 6A.

As seen in FIGS. 6B, 6C, the first projection 208 extends radially from the first aperture 70 into the channel 33 from a base wall 40*a* of the connecting structure 35. In one example embodiment, the first projection 208 extends into the channel 33 at a first projection angle 208*a*. Wherein, the first projection angle 208*a* is between 85° to about 5° relative to the base wall 40*a*. In another example embodiment, the first aperture 70 comprises a substantially circular opening having a first diameter 208*a* at the base wall 40*a* and a second diameter 208*b* at a most inwardly projecting point 73 of the first projection 208. In an example embodiment, the first diameter 208*a* is greater than the second diameter 208*b*. In another example embodiment, such as illustrated in FIGS. 4B and 4C, the first and second projections 208, 206, respectively resemble a funnel, a hyper-cone, or a truncated pseudo-sphere. Such geometrical shapes are formed when a punch engages the stock strip 48 causing both deformation and swage fracturing of the strip, such that the first diameter 208*a* is greater than the second diameter 208*b*.

The interweaving responsive connection 69 of the first and second projections 208, 206, respectively ensures that the apertures 70, 72 are consistently concentrically aligned, as well as ensuring that that the corner structures 32*a*-32*d* are formed correctly (e.g., not over or under travelled to address an under-lap or overlap of the connecting structure 35 and the opposite frame end 54). Additionally, such as illustrated in the first embodiment of the spacer 16 in FIGS. 1A-1E, the interweaving connection 69 of the first and second projections 208, 206, respectively ensures that the end 3*a* engages the corner gap g1 at the corner juncture CJ correctly and accurately; thus, reducing failures at the corner junction CJ. This advantageously reassures that all four corner structures 32 are identical in spacing, size, and angle orientation, thus reducing the potential for failure. Further, the interweaving connection 69 reduces an incidence of accidental disassembly during the sealant and/or curing process.

Illustrated in FIG. 10 is a schematic flow chart illustrating the assembly of spacer frame of FIGS. 4A-7A and FIGS. 8-9C in accordance with one example embodiment of the present disclosure. In FIG. 10.1, the tab 34 approaches connecting structure 35 in which the tab is received inside the u-shaped channel of the connecting structure. In FIGS. 10.2-10.5, the tab stiffener 200 provides an initial lift to the tab 34 as it approaches a first undulation on the connecting structure 35, namely the undulation 200 is a lift 202. The lift 202 elevates the tab or nose 34 upon connecting the tab end 201 so that the tab end and stiffener is elevated over the lower lock aperture 206, allowing a relatively low insertion force (compared to the separation/retention force required to disassemble the assembled spacer frame). The end 201 of the tab 34 and stiffener 200 in one embodiment is elevated such that both clear (without contact) the lower lock 206 during assembly.

The upper lock aperture 208 and tab 34 continue to be advanced into the connecting structure 35 as further illustrated in FIG. 10.6 until the concomitant inter-nesting of the lock apertures 206 and 208 and the lift and catch undulations 202 and 204, respectively to an assembled position. That is, as the upper lock 208 nests onto lower lock 206, the catch undulations 204 nests onto lift undulations 202 with a simultaneous snap as the undulations and locks engage at the same time. The catch undulations 204 and lift undulations 202 206 share the same configuration so that the tab 34 and connecting structure 35 can have a substantially parallel and planar connection when the catch and lift are nested (see FIGS. 10.6, 10.7 and 9A-9C) when assembled. Similarly, the lower lock 206 and upper lock 208 share the same configuration so that the tab 34 and connecting structure can have a substantially parallel and planar connection when the locks are nested (see FIGS. 10.6, 10.7 and 9A-9C) when assembled.

In the illustrated example embodiment, the catch undulations 204 and lift undulations 202 comprise a bowl-like or conical dimple shape (see FIG. 9A) to promote smooth lifting of the tab 34 end 201 (and a low insertion force) during assembly of the spacer 12. The enclosed conical-dimple shape formed by a closed partial pill-like undulation (see recess in FIG. 9C) also prevent any openings in the spacer frame that allow for the escape or entrance of moisture or gases in the spacer frame 12 once evacuated and/or gas filled.

Referring now to FIGS. 10.6-10.7, the figures illustrate the fastener 210 being fixed to secure the nose 34 to the connecting structure 35 through the concentrically nested lower and upper locking apertures 206, 208, respectively. The securing of the fastener 210 in the illustrated example embodiment is through a scrivet that has a threaded body that bites into the both the upper and lower locks 206, 208. That is, different threads of the scrivet 210 engage different circumferential edges of the locks, providing a more secure hold compared to the non-conical simple opening found in conventional spacer frames. The depression of the conical shaped locks 206, 208 further allow a bite along the fastener 210 deeper along a distal end of the fastener body away from the fastener head, avoiding the less securing undercut typical in fasteners (the undercut being an area more prone to stripping out because of the smaller thread diameter in that region). The thread bite further down the thread body of the fastener 210 makes the connection between the tab 34 and connecting structure 35 more secure and resistant to stripping out of the spacer frame 12.

The conical recess in the upper and lower locks 206, 208 further advantageously facilitate the recessing of the fastener head 210 (see FIG. 9C) to allow smooth and substantially planar application of an enhanced seal over the spacer frame with the sealant in later operations. The conical shape apertures 206, 208 further provide a funnel like lead to assists the insertion of the fastener 210 into the upper and lower locks 206, 208.

The tab stiffener 200 also provides geometrical strength to the peripheral or base wall 40*a* of the spacer frame 12 in addition to reducing insertion forces required for assembly. The tab stiffener 200 prevents buckling of the base wall 40*a*, thus increases the retention of the tab 34 and connecting structure 35 when assembled. Further the tab stiffener 200 makes spacers 12 of all widths of the base wall 40*a* substantially equal in retention strength in the assembled position of FIG. 10.6.

The upper and lower locks 208, 206 in combination with undulations of the lift undulations 202 and catch undulations 204 result in an insertion force that is less than the retention force required to separate the tab 34 from the connecting structure 35 when in the assembled position of FIG. 10.6. In testing the embodiment illustrated in FIGS. 9-10, the insertion force to obtain the assembled position of FIG. 10.6 was found to be approximately 1.5 to 2 pounds, and can vary between material types. Tab extraction forces to separate the spacer frame once in the assembled position were tested to have a greater force than the insertion force, assisting in ergonomics and staying power of the assembled spacer frame. Testing further showed that tab extraction forces were approximately 1.5 to 2 times greater than the required insertion or assembled force. This assembled connection illustrated in FIGS. 9 and 10.6 facilitate handling of the spacer frame 12 to prevent separation and provide for automation and less restrictive handling in subsequent operations in the building of an IGU. The connection that occurs in the assembled position of FIG. 10.6 further advantageously alerts the assembler with a haptic response and sound as the undulations 202, 204 and locks 206, 208 click or snap into place.

Figure 13:
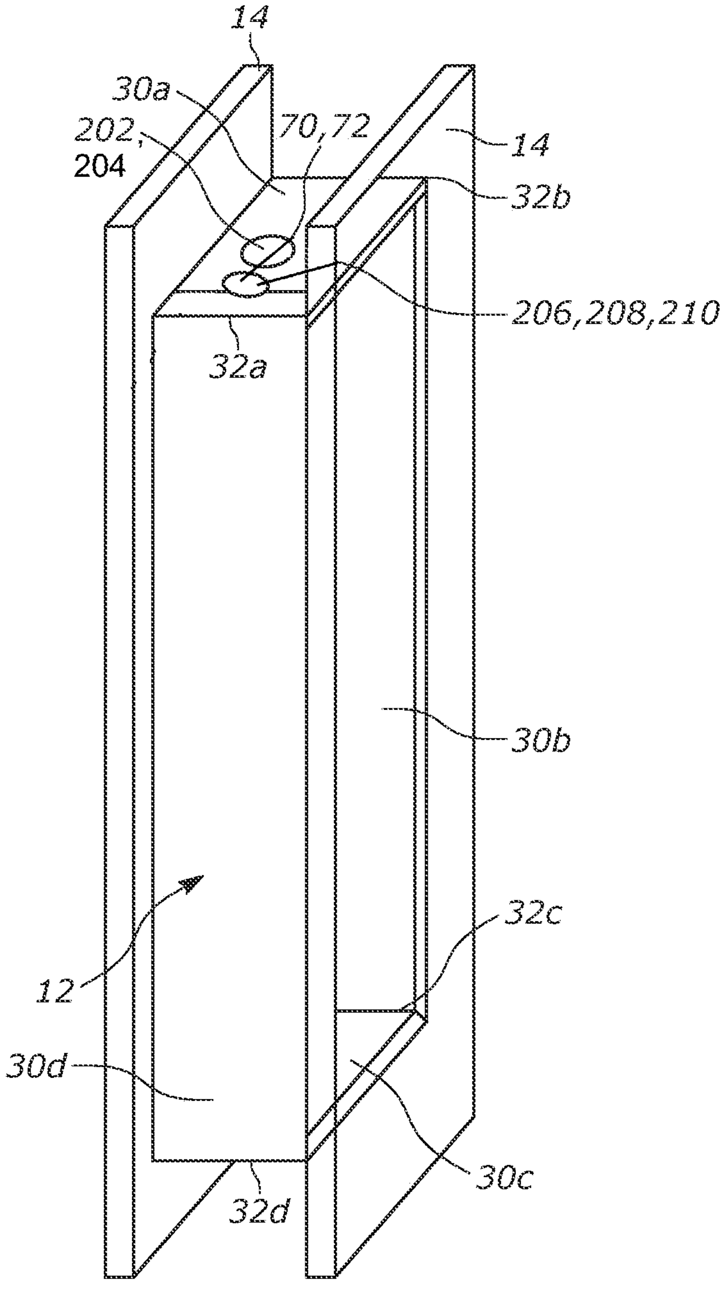
FIG. 13 is a perspective view of an insulating glass unit comprising a spacer frame of the present disclosure, including glass lites in an assembled position in accordance with an example embodiment of the present disclosure.

FIG. 13 shows a perspective view of a finished insulating glass unit 10 including glass lites 14 and a spacer frame 12 segments 30*a*, 30*b*, 30*c*, and 30*d* in an assembled position. The spacer frame 12 includes the connection 69 discussed in any one of the example embodiments above.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The term "coupled" as used herein is defined as connected or in contact either temporarily or permanently, although not necessarily directly and not necessarily mechanically. A device or structure that is "configured" in a certain way is configured in at least that way, but may also be configured in ways that are not listed. The term "integral" as used herein unless defined otherwise means configured in such a way that separation would require destruction to the parts or the assembly of the parts.

It should be appreciated by those of ordinary skill in the art after having the opportunity of reviewing the drawings and/or specification of the present disclosure that may include one or more embodiments, e.g., $E_1$, $E_2$, . . . $E_n$ and that each embodiment E may have multiple parts $A_1$, $B_1$, $C_1$ . . . $Z_n$ that (without further description) could be combined with other embodiments $E_n$ parts or lack of parts originally associated with one or all embodiments, or any combination of parts and embodiments thereof. It should further be appreciated that an embodiment may include only one part or a lesser number of parts of any embodiment or combination of embodiments that was described or shown in the specification and/or drawings, respectively without further description than what was disclosed in the original embodiment or combination of embodiments.

To the extent that the materials for any of the foregoing embodiments or components thereof are not specified, it is to be appreciated that suitable materials would be known by one of ordinary skill in the art for the intended purposes after having the benefit of reviewing the subject disclosure and accompanying drawings.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A spacer frame assembly comprising:

a substantially linear channel comprising two lateral walls connected by a base wall, the channel having first and second ends that, when assembled, includes at least three sides and corresponding corners between each of the sides;

the linear channel further includes a nose portion of the first end and a receiving portion of the second end having a channel for receiving the nose portion; and the nose portion comprising a first undulation in the first end and a first aperture and the receiving portion comprising a second undulation in the second end and a second locking aperture having a projection, the first and second undulations nesting when said ends are in an assembled position and the first locking aperture residing within and aligning with the second aperture aligning to form a through-hole when said ends are in the assembled position.

2. The spacer frame assembly of claim 1 further comprising a first locking aperture on said first end defining a second projection, the projections of the first and second locking apertures nesting within each other when the ends are in an assembled position.

3. The spacer frame assembly of claim 2 further comprising concomitant nesting of said undulations and locking apertures when said ends achieve the assembled position.

4. The spacer frame assembly of claim 2, wherein the first and second locking apertures form a gas fill aperture in the assembled position.

5. The spacer frame assembly of claim 1 further comprising a stiffener formed within said nose.

6. The spacer frame assembly of claim 1 wherein the spacer frame is formed from a metal material.

7. A spacer frame assembly comprising:

a substantially linear channel comprising two lateral walls connected by a base wall, the channel having first and second ends that when assembled, includes at least three sides and corresponding corners between each of said sides;

a nose portion of the first end and a second receiving portion of said second end, the receiving portion having a channel for receiving the nose portion of a connecting structure; and a tab stiffener comprising an undulation extending transversely along an end of said base wall of said nose portion, the tab stiffener provides anti-buckling strength to said spacer frame.

8. The spacer frame assembly of claim 7 further comprising a first locking aperture on said first end and a second locking aperture on said second end, the first and second locking apertures nesting when the ends are in an assembled position.

9. The spacer frame assembly of claim 7 wherein said nose portion further comprises a first undulation in the first end and the receiving portion comprising a second undulation in the second end, the first and second undulations nesting when said ends are in an assembled position.

10. The spacer frame assembly of claim 8 wherein said nose portion further comprises a first undulation in the first end and the receiving portion comprising a second undulation in the second end, the first and second undulations nesting when said ends are in an assembled position.

11. The spacer frame assembly of claim 9 wherein said first and second undulations comprise first and second bowl-like members, respectively.

12. The spacer frame assembly of claim 7 wherein said stiffener is a corrugation in said base wall.

13. The spacer frame assembly of claim 8 wherein said stiffener and said first and second locking apertures reside in said base wall and project away from the opening in said channel formed by said first and second lateral walls.

14. The spacer frame assembly of claim 9 wherein said stiffener and said first and second undulations reside in said base wall and project away from the opening in said channel formed by said first and second lateral walls.

15. The spacer frame assembly of claim 13 wherein said first and second undulations further reside in said base wall and project away from the opening in said channel formed by said first and second lateral walls.

16. The spacer frame assembly of claim 15 wherein said first and second undulations comprise first and second bowl-like members, respectively.

17. The spacer frame assembly of claim 15 wherein said stiffener is a corrugation in said base wall.

18. A method for manufacturing a spacer frame assembly, the method comprising the steps of:

providing an elongated metal strip;

providing a stamping station comprising at least one die set and a controller;

forming at least three corners by the at least one die set controlled by the controller;

forming a connecting portion of the elongated metal strip by the at least one die set controlled by the controller;

forming a nose portion of the elongated metal strip by the at least one die set controlled by the controller; and forming a first undulation and a first aperture in said nose portion and a second undulation and a second aperture defining a projection in said connecting portion such that said first and second undulations nest when said nose portion and said connecting portion are in an assembled position and the projection of the second aperture nests within the first aperture when said nose portion and said connecting portion are in the assembled position.

19. The method of claim 18 further comprising the step of forming a stiffener in the nose portion by the at least one die set controlled by the controller.

20. The method of claim 18 further comprising the step of forming a first locking aperture in said nose portion by the at least one die set controlled by the controller and forming a second locking apertures in said connecting portion by the at least one die set controlled by the controller.

* * * * *